Jan. 27, 1953   J. P. WOODS   2,626,979
APPARATUS FOR ELECTRICALLY LOGGING BOREHOLES
Filed April 7, 1948   3 Sheets-Sheet 1

Fig.1

ATTEST
Melvin C. Flint

INVENTOR.
John P. Woods
BY Herbert E. Birch
Attorney

Jan. 27, 1953     J. P. WOODS     2,626,979
APPARATUS FOR ELECTRICALLY LOGGING BOREHOLES
Filed April 7, 1948     3 Sheets-Sheet 2

ATTEST

INVENTOR.
John P. Woods
BY
Attorney

Patented Jan. 27, 1953

2,626,979

UNITED STATES PATENT OFFICE 2,626,979

APPARATUS FOR ELECTRICALLY LOGGING BOREHOLES

John P. Woods, Dallas, Tex., assignor to The Atlantic Refining Company, Philadelphia, Pa., a corporation of Pennsylvania Application April 7, 1948, Serial No. 19,553

12 Claims. (Cl. 175—182)

This invention relates to a method and apparatus for electrical logging, and more particularly to a method and apparatus for electrically logging the resistivity of the earth's formation traversed by a bore hole.

In geological explorations, valuable information can be obtained by determining various characteristics of the earth's formation traversed by a bore hole, and correlating information obtained from a plurality of bore holes in a given area.

Various methods are known in the art for investigating the earth's formation traversed by a bore hole. An accurate knowledge of the various subsurface strata may be obtained from core samples taken during core drilling. However, this is a tedious operation and often results in difficulty in determining the boundaries of the strata.

It already has been found advantageous to investigate the earth's formation subsequent to the drilling of the bore hole by lowering therein an instrument for taking measurements indicative of the nature of the strata traversed by the bore hole. Preferably the measurement most commonly taken is that of resistivity, and "electrical logs" are obtained showing the depth of the geological interfaces and respective thicknesses of the various strata.

Sundry methods and apparatus are known in the prior art for electrically logging bore holes. By many of these methods there are obtained electrical logs which show the depth, respective thicknesses, and relative resistivity of the various strata, but from which the specific resistivity of the strata cannot be ascertained readily. Further, some electrical well logging devices employ an optical system together with photographic apparatus including a light sensitive element for recording the electrical log. This necessitates the careful handling of the equipment, and erratic operation frequently results from the normal handling thereof in the field. Moreover, an interim, which is usually undesirable, exists between the electrical logging of the bore hole and the forming of a permanent record of the electrical log due to processing of the light sensitive elements. Further, many of the systems are adversely affected by the contact resistance of the electrodes with the earth and drilling mud and variations therein with the result that they are relatively insensitive to small changes in resistivity and electrical logs produced thereby are frequently inaccurate and difficulty is experienced in correlating the electrical logs obtained from various wells in a single area.

Accordingly, one object of this invention is to provide a method and apparatus for electrically logging a bore hole whereby the specific resistivities of the various strata traversed by the bore hole may be ascertained readily.

Another object of the invention is to provide a method and apparatus for rapidly and accurately providing an electrical log of various strata traversed by a bore hole.

A further object is to provide an apparatus for electrically logging a bore hole which will provide a permanent record of the electrical log simultaneously with the logging of the bore hole.

A still further object of the invention is to provide an apparatus for continuously recording data in the form of electrical signals which is simple in construction, and records with high accuracy.

Another object is to provide a method and apparatus for electrically logging a bore hole which are capable of detecting relatively small changes in resistivity and which are not adversely affected by high electrode contact resistance and variations therein.

Other objects and advantages of the present invention will be apparent from the following description and accompanying drawings.

In accordance with the invention, the well-known four-electrode method is employed for causing alternating current to flow through the earth's formation between a fixed point on the earth's surface adjacent a bore hole and a movable point therein, and for receiving intermediately thereof a potential established by the flow of alternating current.

A ground electrode in contact with the earth is provided at the surface thereof and adjacent a bore hole filled with a conductive fluid. Three vertically spaced-apart electrodes are maintained in intimate contact with the conductive fluid in a manner to permit the lowering and raising of the three electrodes, as a unit, within the bore hole.

A first alternating current is provided and caused to flow between one vertically spaced electrode and ground electrode through the conductive fluid and sundry sub-surface strata adjacent the bore hole.

A potential is established between a pair of the vertically spaced electrodes by this flow of alternating current between the one vertically spaced electrode and ground electrode. This potential is received by the pair of electrodes, hereinafter referred to as potential electrodes, and is applied to one input winding of a differential transformer. A potential derived by the flow of the first alternating current through a resistive network including a potentiometer is applied to the other input winding of the differential transformer in a manner to provide, at such times as there exists a difference in the amplitudes of the compared potentials, in the output winding of the differential transformer, a second alternating current having phase characteristics dependent upon the amplitude difference between the compared potentials.

The second alternating current from the differential transformer is employed to vary the resistance of the potentiometer in a manner to maintain substantially continuously a balance between the derived potential and the received potential.

A recording device is provided for continuously recording the position of the variable contact of the potentiometer.

When an alternating current is impressed upon one vertically spaced electrode and ground electrode, current flow (assuming that the electrodes suspended in the bore are in a homogeneous stratum and the distance from any electrode to a stratum bordering is large compared to the distance between the potential electrodes) is radial and current density is uniform at all points equidistant from the one vertically spaced electrode. The current density "$i$" at any point a distance "$X$" from the one vertically spaced electrode may be deduced from the following equation:

$$i = \frac{I}{4\pi X^2}$$

in which $I$ = the current flowing between the ground electrode and the one vertically spaced electrode.

Since voltage is the product of current multiplied by resistance and in view of the above equation, the potential difference "$E$" between the potential electrodes may be expressed by the following equation:

$$E = \int_{X_1}^{X_2} \frac{I}{4\pi X^2} r\, dx$$

where $X_2$ = the distance between the one electrode and the most distant potential electrode.

$X_1$ = the distance between the one electrode and the other potential electrode.

$r$ = the specific resistivity of the stratum.

From this, by integrating and transposing, the specific resistivity of the stratum between the potential electrodes may be represented by the following equation:

$$r = \frac{4\pi X_1 X_2}{(X_2 - X_1)} \cdot \frac{E}{I}$$

If the vertically spaced electrodes are kept a known distance apart, by determining the ratio $E/I$, the specific resistivity of the stratum between the potential electrodes may be ascertained readily from the above equation. By substantially continuously maintaining a balance between the derived potential and the received potential, in the manner as hereinbefore described, the derived potential applied across the second input winding of the differential transformer is equal the potential $E$ established between the potential electrodes. Since this potential is derived from the first alternating current $I$ impressed upon the ground electrode and the one vertically spaced electrode, the resistance represented by the position of the moving contact of the potentiometer, the position being continuously recorded as described hereinbefore, is equal to the ratio $E/I$. Thus it readily is seen that the specific resistivity of the earth's strata traversed by a bore hole may be ascertained by means of the above equation together with the electrical log produced in accordance with this invention.

Referring to the drawings, a more detailed description of the nature and operation of the invention will now be presented.

Figure 1:
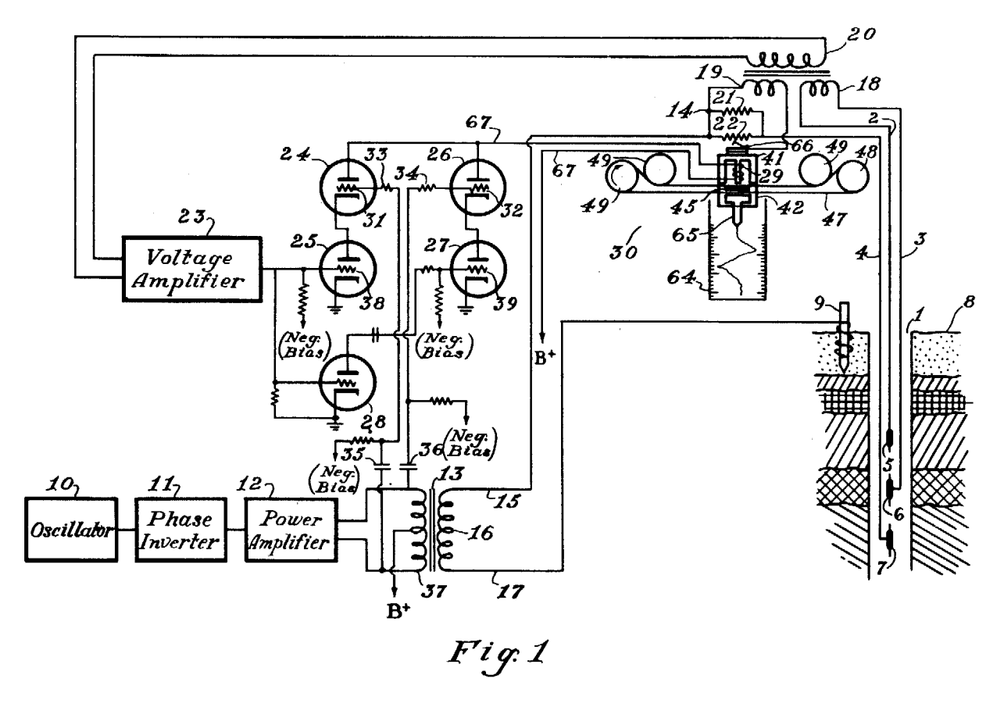
Figure 1 is a diagrammatic view of the electrical logging apparatus.

In Figure 1, numeral 1 denotes generally a bore hole traversing a plurality of sub-surface strata and filled with a conductor fluid. It is to be understood that the conductive fluid may be water or ordinary drilling mud. Suspended within the bore hole 1 from flexible cables 2, 3, and 4, and in intimate contact with the conductive fluid are three vertically spaced electrodes, 5, 6, and 7, respectively, which are lowered and raised in the bore hole, as a unit by means, not shown, at the earth's surface 8. Although the spacing is not critical, electrodes having a length of 4 inches are spaced preferably on 40 inch centers.

A ground electrode 9 is provided at the earth's surface 8 adjacent the bore hole. A first alternating current is impressed upon the lowermost electrode 7 and ground electrode 9 causing current flow therebetween through the conductive fluid and sub-surface strata adjacent the bore hole 1, as described hereinbefore. Any suitable means for generating an alternating current may be employed. However, it is preferable to use an oscillator 10 such, for example, as a Wien Bridge Oscillator. The output of oscillator 10 is coupled through a conventional phase inverter 11 to power amplifier 12. Any suitable power amplifier may be employed for amplifying the alternating current generated by oscillator 10.

The amplified alternating current is applied through a conventional iron core transformer 13 and through impedance network 14, which will be described in detail hereinafter, to lowermost electrode 7 and ground electrode 9. As shown in Figure 1, one terminal 15 of output winding 16 of transformer 13 is connected through impedance network 14 to lowermost electrode 7, and the other terminal 17 is directly connected to ground electrode 9. A potential established between potential electrodes 5 and 6 by the first alternating current flowing through the earth between lowermost electrode 7 and ground electrode 9 is received thereby and applied through cables 2 and 3 to one input winding 18 of a differential transformer comprising input windings 18 and 19, and an output winding 20. Preferably, the differential transformer is made up of three identical windings 18, 19, and 20 and arranged in a manner to provide in output winding 20 an alternating current having an amplitude equal the difference in amplitude between a potential applied to input winding 18 and a potential applied to input winding 19, and being in phase with the input potential of greater amplitude.

The potential established between electrodes 5 and 6 and applied to input winding 18 is compared in the differential transformer with a potential developed in input winding 19 due to flow of the first alternating current through shunt resistor 21 and moving-arm potentiometer 22. Obviously, the amplitude of this derived potential is dependent upon the resistance of impedance network 14 and can be controlled by potentiometer 22.

It should be noted that changes in contact resistance between the electrodes and the earth and the drilling mud will alter the amount of current flowing between the potential electrodes 5 and 6 and, therefore, the derived potential. However, a corresponding change in current flowing in impedance network 14 and the derived potential across input winding 19 will occur, thereby preventing variations in contact resistance from adversely affecting the accuracy of the results. It is also readily seen that by balancing of the received potential with the derived potential the system is capable of detecting relative small changes in the resistivity of the earth between the potential electrodes.

Any difference beween the amplitudes of the received potential applied to winding 18 and the derived potential established in winding 19 will cause a second alternating current to be established in output winding 20 of the differential transformer. Output winding 20 of the differential transformer is directly connected to a conventional square wave voltage amplifier 23. Thus, alternating currents developed in output winding 20 are amplified and converted into square waves in voltage amplifier 23.

The amplified currents from voltage amplifier 23 are fed into a phase discriminator comprising tubes 24, 25, 26, 27, and 28, and their respective circuit elements. Operation of the phase discriminator during the entire cycle of the second alternating current is obtained by connecting tubes 24 and 25 in parallel with tubes 26 and 27, the amplified signals from square wave voltage amplifier 23 being applied to tube 27 through conventional phase inverter 28 operatively connected therebetween, as shown. The cathodes of tubes 24 and 26 are directly connected to the plates of tubes 25 and 27, as shown. Connected in the plate circuit of tubes 24 and 26 is actuating coil 29 of a recording device designated generally by numeral 30. Grids 31 and 32 of tubes 24 and 26 respectively are connected through grid resistors 33 and 34 and D. C. blocking condensers 35 and 36 to the input winding 37 of transformer 13, as shown. The value of grid resistors 33 and 34 and the bias applied to grids 31 and 32 of tubes 24 and 26, respectively, are preferably such as to cause the alternating current from transformer 13 to be clipped whereby such signal will be present on grids 31 and 32 in the form of substantially a square wave. Thus, it will readily be seen that the voltage on grids 31 and 32 will be in phase with the first alternating current. The output circuit of voltage amplifier 23 is directly connected to grid 38 of tube 25, and connected through phase inverter 28 to grid 39 of tube 27.

When a second alternating current is established in output winding 20 of the differential transformer due to a difference in amplitude of potentials applied to input windings 18 and 19, this alternating current will be amplified and clipped by voltage amplifier 23 and applied to grids 38 and 39 of tubes 25 and 27, respectively. During the positive portion of the cycle, due to amplification in square wave voltage amplifier 23, the voltage will be sufficient to cause these tubes to be fully conducting and during the negative portion to be non-conducting. In a similar manner the signals applied to grids 31 and 32 of tubes 24 and 26 respectively will cause the latter to be fully conducting during the positive portion of the cycle and non-conducting during the negative portion. Bearing in mind that the cathodes of tubes 24 and 26 are directly connected to the plates of tubes 25 and 27, respectively, it is readily seen that D. C. current will flow in the output circuit of the discriminator and consequently in actuating coil 29 at all times when the second alternating current is in phase with the first alternating current. However, if the second alternating current is 180 degrees out of phase with the first alternating current, current will not flow in the ouput circuit of the discriminator since at no time will the grid potentials of tubes 24 and 26 be in phase with those of tubes 25 and 27, respectively.

Figures 2, 3:
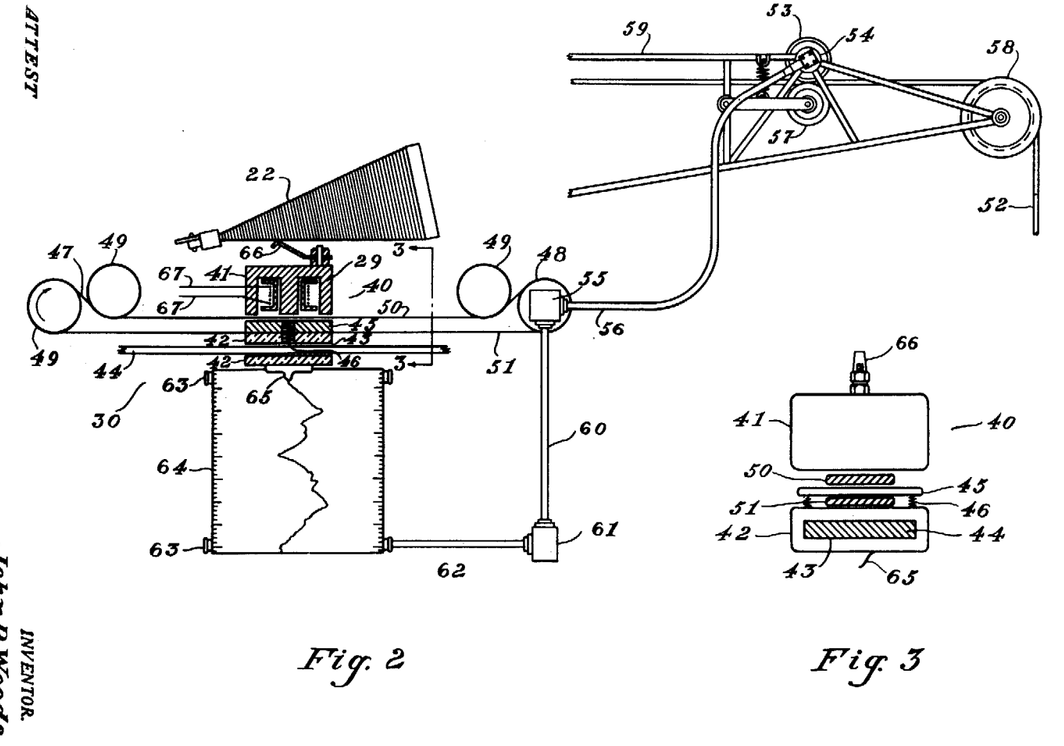
Figure 2 is an elevational view, partially in cross-section, of a recording device for continuously recording data in the form of electrical signals.
Figure 3 is an enlarged view, partially in cross-section, of the recording device taken along the line 3—3 of Figure 2.

Current from the phase discriminator flowing through actuating coil 29 controls the operation of novel recording device 30 suitable for recording data in the form of electrical signals. Referring to Figure 2, the recording device 30 includes a magnetic clutch designated generally by numeral 40 comprising a magnetizable member 41 about which is provided actuating coil 29, as shown, a base member 42 provided with longitudinal opening 43 for receiving guide rail 44, magnetic plate 45 mounted in a manner to permit movement of plate 45 toward and away from magnetizable member 41, and a resilient member, for example, spring 46 normally urging magnetic plate 45 toward base member 42. Any suitable means, not shown, may be employed for rigidly securing magnetizable member 41 to base member 42 and for preventing lateral and longitudinal movement of magnetic member 45. Figure 3, an enlarged view partially in section taken along line 3—3 of Figure 2, shows more clearly the operating position of the magnetic clutch 40 in relation to belt strands 50 and 51, and guide rail 44.

Movement of magnetic clutch 40 along guide rail 44 is provided by means of endless belt 47 continuously driven in a given direction during the logging of the bore hole by a pulley system including driver pulley 48 and idler pulleys 49, and having belt strand 50 thereof positioned between magnetizable member 41 and magnetic plate 45, and belt strand 51 between magnetic plate 45 and base member 42. Rotary motion is supplied to the driver pulley 48 by the raising and lowering of sheath 52, enclosing cables 2, 3, and 4, in the bore hole and is transmitted thereto through measuring wheel 53, gear boxes 54 and 55 and mechanical cable 56.

As sheath 52 passes from a storage reel, not shown, between measuring wheel 53 and pressure wheel 57, over sheave 58 provided at the end of boom 59, and into bore hole 1, corresponding movement of measuring wheel results which is transmitted through gear box 54, mechanical cable 56 and gear box 55 to driver pulley 48. It is seen that the gear ratios employed in gear boxes 54 and 55 determine the relative speed of driver pulley 48 and, consequently, endless belt 47. By means of shaft 60, gear box 61, shaft 62 and roller 63, movement of sheath 52 also may be utilized to move recording paper 64 in contact with recording pen 65 mounted on base member 42 at a desired rate relative to the lowering of the vertically spaced electrodes 5, 6, and 7 in the bore hole.

Moving arm 66 of potentiometer 22 is mounted on magnetizable member 41 and insulated therefrom by any known means to supply thereby movement to arm 66 corresponding to the movement of magnetic clutch 40 along guide rail 44. The position of moving arm 66 is continuously recorded on paper 64 by recording pen 65.

The operation of the recording device is as follows: Assuming for purposes of illustration only that a second alternating current established in output winding 20 as a result of a difference in magnitude of the potentials applied to input windings 18 and 19 of the differential transformer is in phase with the first alternating current and, therefore, direct current will flow in the output of the phase discriminator and be fed through leads 67 to actuating coil 29 when the received potential in input winding 18 is greater than the derived potential in input winding 19, and that the direction of movement of endless belt 47 is that denoted by the arrow in Figure 1. Now, when the potential in winding 18 is greater than that in winding 19, current will flow in actuating coil 29 energizing magnetizable member 41 to thereby cause magnetic plate 45 to move upwardly toward magnetizable member 41, clamping belt strand 50 of endless belt 47 therebetween. Movement of endless belt 47 will cause the magnetic clutch to move to the right on guide rail 44 thereby changing the position of moving arm 66 in a manner to provide an increase in amplitude of the derived potential in input winding 19, as described hereinbefore. The magnetic clutch 40 will continue to be moved to the right thereby causing the potential in input winding 19 to increase until the potential in input winding 18 is no longer of a greater amplitude than that in input winding 19, at which time current will cease flowing in actuating coil 29 and magnetic plate 45 will be urged downwardly by resilient member 46 toward base member 42 clamping belt strand 51 of endless belt 47 therebetween. Thereupon, magnetic clutch 40 will be caused to move to the left thereby decreasing the potential in winding 19 until current flow is again initiated in coil 29. Thus, it is seen that during operation of the logging device the magnetic clutch will function to engage alternately the opposed strands 50 and 51 of belt 47, thereby maintaining substantially continuously a balance between the received potential in winding 18 and the derived potential in winding 19. When the magnetic clutch 40 is at the balance point, the magnetic plate 45 will alternately clamp the opposed belt strands 50 and 51 of the belt 47 in a hunting action.

Similarly, if at the beginning the received potential in winding 18 is less than the amplitude of the potential in winding 19, a second alternating current will be developed in output winding 20 but, under the conditions assumed, will be discriminated against in the phase discriminator and no current will flow in actuating coil 29. The magnetic plate 45 will be urged downwardly by resilient member 46 thereby clamping the magnetic clutch 40 to belt strand 51 of the endless belt 47, causing moving arm 66 to be moved to the left and decreasing the potential in winding 19 until the potential in winding 18 is no longer less than that in winding 19.

Thus, by means of magnetic clutch 40 a balance is maintained substantially continuously between the derived potential and the received potential by varying the position of moving arm 66 of potentiometer 22, the position of arm 66 being continuously recorded by recording pen 65. From the electrical log thus produced the specific resistivity of the earth's strata traversed by the bore hole may be ascertained readily as described hereinbefore.

Although certain conditions were assumed to exist, for purposes of illustration, relative to the direction of movement of the endless belt and the relationship of the second alternating current to the difference between the received potential and the derived potential, these conditions may be changed provided that the second alternating current signals passed by the discriminator will cause the moving arm of potentiometer 22 to move in a direction as to maintain a balance between the derived potential and received potential.

It should be pointed out that shunt resistor 21 determines the maximum resistivity capable of being measured by the logging device. Accordingly, control of the resistivity range of the apparatus may be had by selection of shunt resistor 21.

A negative brid bias such, for example, as 12 volts, may be applied to grids 38 and 39 of tubes 25 and 27, respectively, to prevent internal noise or cross-feed in the electrical circuit from causing the discriminator to function erratically.

Although any suitable conventional moving-arm potentiometer may be employed, preferably the potentiometer is of conical shape, as shown in Figure 2. By employing a potentiometer having a conical shape, small changes in strata having low resistivity may be clearly shown, and changes in strata having high resistivity have ample clarity for easy interpretation.

Figure 4:
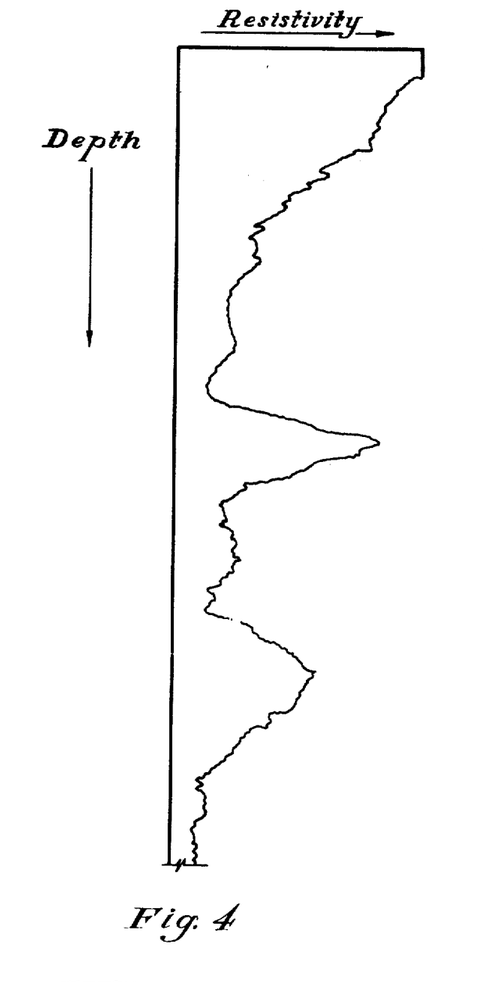
Figure 4 is a plot or bore hole log of resistivity plotted against depth.
Figure 5:
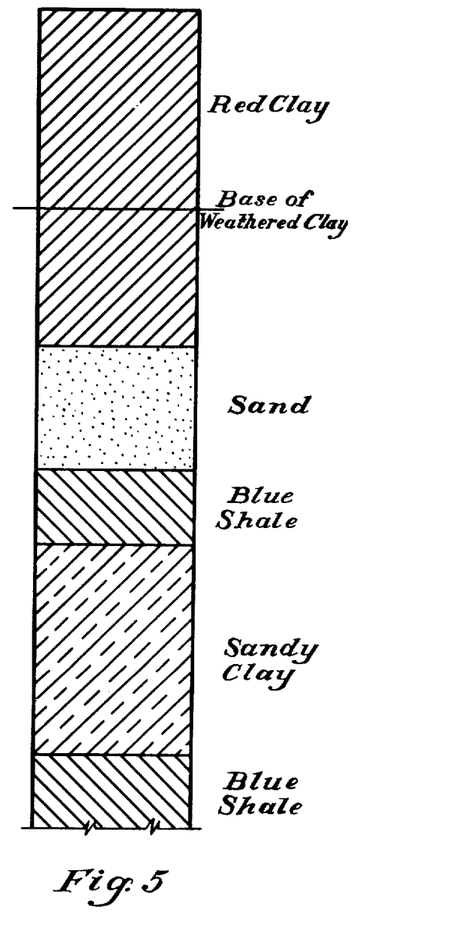
Figure 5 is a sectional view of the formation producing the bore hole log shown in Figure 4.

Referring to Figure 4, a bore hole log is shown of resistivity plotted against depth for the formation of Figure 5. The width of the adjacent layers and the sharpness of the boundary between them control the sharpness of the "break," or boundary indication. Where the layers are comparatively thin, or the interfaces indefinite, "breaks" are not sharp and boundaries must be approximated.

In general, the weathered layer is indicated by a high resistivity near the surface, decreasing in resistivity at a gradual rate, and terminating in a "flat" or a stabilization of the log, at the base, as shown in Figure 4.

Figures 2 and 3 show belt strand 51 clamped between magnetic plate 45 and base member 43 which condition exists when magnetizable member 41 is deenergized. However, at such times as magnetizable member is energized by current flow in coil 29, magnetic plate 45 is urged toward magnetizable member 41 thereby clamping belt strand 47 therebetween.

It should be pointed out that it is not essential that the first alternating current be caused to flow between the ground electrode and the lowermost vertically spaced electrode but, as an alternative, it may be impressed upon the ground electrode and any vertically spaced electrode with a pair of vertically spaced electrodes functioning as potential electrodes.

I claim:

1. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including an impedance through which said alternating current is caused to flow to generate a standard signal, said impedance including a variable element for varying the amplitude of said standard signal, means for comparing the detected potential with the standard signal, means responsive to a difference in amplitude between the detected potential and standard signal for varying said variable element so as to maintain substantially continuously a balance between the detected potential and the standard signal, and means for continuously recording variations in said variable element.

2. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including an impedance through which said alternating current is caused to flow to generate a standard signal, said impedance including a variable resistor for varying the amplitude of said standard signal, means for comparing the detected potential with the standard signal, means responsive to a difference in amplitude between the detected potential and standard signal for varying said variable resistor so as to maintain substantially continuously a balance between the detected potential and the standard signal, and means for continuously recording the resistance of said variable resistor.

3. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a variable resistor for deriving a standard potential by the flow of said alternating current therethrough, means for comparing the detected potential with the derived potential, means responsive to a difference in amplitude between the potentials for varying the resistance of said variable resistor so as to maintain substantially continuously a balance between the detected potential and the derived potential, and means for continuously recording the value of said resistance.

4. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a variable resistor for deriving a standard potential by the flow of said alternating current therethrough, means for comparing the detected potential with the derived potential, means for providing a second alternating current, the phase of which is dependent upon the difference in amplitude between the detected potential and the derived potential, means responsive to the second alternating current for varying the resistance of said variable resistor so as to maintain substantially continuously a balance between the detected potential and the derived potential, and means for continuously recording the value of said resistance.

5. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a moving arm potentiometer for deriving a standard potential by the flow of said alternating current therethrough, means for comparing the detected potential with the derived potential, means for providing a second alternating current, the phase of which is dependent upon the difference in amplitude between the detected potential and the derived potential, and means responsive to the second alternating current for varying the resistance of said potentiometer so as to maintain substantially continuously a balance between the detected potential and the derived potential and for continuously recording the value of said resistance, the last mentioned means including an endless belt, means for continuously rotating said belt, and a magnetic clutch adapted for movement in the plane of said belt and actuated by changes in the phase of said second alternating current to alternately engage opposed belt strands, the moving arm of said potentiometer being operatively connected to said magnetic clutch.

6. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a moving arm potentiometer for deriving a standard potential by the flow of said alternating current therethrough, means for comparing the detected potential with the derived potential, means for providing a second alternating current, the phase of which is dependent upon the difference in amplitude between the detected potential and the derived potential, and means responsive to the second alternating current for varying the resistance of said potentiometer so as to maintain substantially continuously a balance between the detected potential and the derived potential and for continuously recording the value of said resistance, the last mentioned means including an endless belt, means for continuously rotating said belt, a magnetic clutch adapted for movement in the plane of said belt and actuated by changes in the phase of said second alternating current to alternately engage opposed belt strands, the moving arm of said potentiometer being operatively connected to said magnetic clutch, and a recording pen affixed to said magnetic clutch whereby the resistance of said potentiometer may be continuously recorded.

7. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a moving arm potentiometer for deriving a standard potential by the flow of said alternating current therethrough, means for comparing the detected potential with the derived potential, means for providing a second alternating current, the phase of which is dependent upon the difference in amplitude between the detected potential and the derived potential, and means responsive to the second alternating current for varying the resistance of said potentiometer so as to maintain substantially continuously a balance between the detected potential and the derived potential and for continuously recording the value of said resistance, the last mentioned means including an endless belt, means for continuously rotating said belt, a magnetic clutch adapted for movement in the plane of said belt and actuated by changes in the phase of said second alternating current to alternately engage opposed belt strands, the moving arm of said potentiometer being operatively connected to said magnetic clutch, a recording pen affixed to said magnetic clutch whereby the resistance of said potentiometer may be continuously recorded, and means for moving recording paper in contact with the recording pen at a predetermined rate whereby the resistance of said potentiometer is continuously recorded.

8. In an electrical system for logging bore holes having conductive fluid therein and including means for causing alternating current to flow through the earth between a fixed point on the earth's surface adjacent the bore hole and a movable point therein, and means for detecting intermediate thereof a potential established by the flow of said alternating current, the combination therewith of apparatus for obtaining a continuous indication of the resistivity of the subterranean formations traversed by the bore hole, said apparatus including a moving arm potentiometer for deriving a standard potential by the flow of said alternating current therethrough, means for comparing the detected potential with the derived potential, means for providing a second alternating current, the phase of which is dependent upon the difference in amplitude between the detected potential and the derived potential, and means responsive to the second alternating current for varying the resistance of said potentiometer so as to maintain substantially continuously a balance between the detected potential and the derived potential and for continuously recording the value of said resistance, the last mentioned means including an endless belt, means for continuously rotating said belt, a magnetic clutch adapted for movement in the plane of said belt and actuated by changes in the phase of said second alternating current to alternately engage opposed belt strands, the moving arm of said potentiometer being operatively connected to said magnetic clutch, a recording pen affixed to said magnetic clutch whereby the resistance of said potentiometer may be continuously recorded, and means for moving recording paper in contact with the recording pen at a predetermined rate whereby the resistance of said potentiometer is continuously recorded, said magnetic clutch including a magnetizable member, means for alternately energizing and deenergizing the magnetizable member in accordance with changes in the phase of the second alternating current, a base member, and a magnetic plate movably mounted between the magnetizable member and the base member to engage normally the belt strand between the magnetic plate and the base member when the magnetizable member is deenergized and to engage the belt strand between the magnetic plate and the magnetizable member when the magnetizable member is energized.

9. In apparatus for recording information in the form of modulated electrical signals including means for generating a standard electrical signal having a wave form similar to that of the signal carrying the information, the generating source including a variable element for modulating the standard signal, means for comparing said electrical signals, and means for providing a third signal having a characteristic dependent upon a difference between said signals, the combination therewith of a mechanism comprising an endless belt, means for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, and means mounted on said clutch for continuously recording variations in said variable element.

10. In apparatus for recording information in the form of modulated electrical signals including means for generating a standard electrical signal having a wave form similar to that of the signal carrying the information, the generating source including a variable element for modulating the standard signal, means for comparing said electrical signals, means for providing a third signal having a characteristic dependent upon a difference between said signals, the combination of a recording mechanism comprising an endless belt, means for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, a recording pen affixed to said magnetic clutch, and means for moving recording paper in contact with the recording pen at a predetermined rate whereby variations in said variable element may be continuously recorded.

11. In apparatus for recording information in the form of modulated electrical signals including means for generating a standard electrical signal having a wave form similar to that of the signal carrying the information, the generating source including a variable element for modulating the standard signal, means for comparing said electrical signals, means for providing a third signal having a characteristic dependent upon a difference between said signals, the combination of a recording mechanism comprising an endless belt, means for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, a recording pen affixed to said magnetic clutch, and means for moving recording paper in contact with the recording pen at a predetermined rate whereby variations in said variable element may be continuously recorded, said magnetic clutch including a magnetizable member, means for alternately energizing and deenergizing the magnetizable member in accordance with variations in said characteristic of the third signal, a base member, and a magnetic plate movably mounted between the magnetizable member and the base member to engage normally the belt strand between the magnetic plate and the base member when the magnetizable member is deenergized and to engage the belt strand between the magnetic plate and the magnetizable member when the magnetizable member is energized.

12. In apparatus for recording information in the form of modulated electrical signals including means for generating a standard electrical signal having a wave form similar to that of the signal carrying the information, the generating source including a variable element for modulating the standard signal, means for comparing said electrical signals, means for providing a third signal having a characteristic dependent upon a difference between said signals, the combination of a recording mechanism comprising an endless belt, a pulley system for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, a recording pen affixed to said magnetic clutch, and means for moving recording paper in contact with the recording pen at a predetermined rate whereby variations in said variable element may be continuously recorded, said magnetic clutch including a magnetizable member, means for alternately energizing and deenergizing the magnetizable member in accordance with variations in said characteristic of the third signal, a base member, and a magnetic plate movably mounted between the magnetizable member and the base member to engage normally the belt strand between the magntic plate and the base member when the magnetizable member is deenergized and to engage the belt strand between the magnetic plate and the magnetizable member when the magnetizable member is energized.

JOHN P. WOODS.

REFERENCES CITED

The following references are of record in the file of this patent:

UNITED STATES PATENTS

| Number | Name | Date |
|---|---|---|
| 2,206,894 | Silverman | July 9, 1940 |
| 2,349,225 | Scherbatskoy et al. | May 16, 1944 |
| 2,397,535 | Cooley | Apr. 2, 1946 |
| 2,412,639 | Traugott | Dec. 17, 1946 |
| 2,424,622 | McClure | July 29, 1947 |
| 2,446,527 | Chun | Aug. 10, 1948 |
| 2,488,491 | Davis | Nov. 15, 1949 |

---

Certificate of Correction

Patent No. 2,626,979            January 27, 1953

JOHN P. WOODS

It is hereby certified that error appears in the printed specification of the above numbered patent requiring correction as follows:

Column 1, line 23, for "Preferably" read *Probably*; column 8, line 28, for "brid" read *grid*;

and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.* having a wave form similar to that of the signal carrying the information, the generating source including a variable element for modulating the standard signal, means for comparing said electrical signals, means for providing a third signal having a characteristic dependent upon a difference between said signals, the combination of a recording mechanism comprising an endless belt, means for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, a recording pen affixed to said magnetic clutch, and means for moving recording paper in contact with the recording pen at a predetermined rate whereby variations in said variable element may be continuously recorded, said magnetic clutch including a magnetizable member, means for alternately energizing and deenergizing the magnetizable member in accordance with variations in said characteristic of the third signal, a base member, and a magnetic plate movably mounted between the magnetizable member and the base member to engage normally the belt strand between the magnetic plate and the base member when the magnetizable member is deenergized and to engage the belt strand between the magnetic plate and the magnetizable member when the magnetizable member is energized.

12. In apparatus for recording information in the form of modulated electrical signals including means for generating a standard electrical signal having a wave form similar to that of the signal carrying the information, the generating source including a variable element for modulating the standard signal, means for comparing said electrical signals, means for providing a third signal having a characteristic dependent upon a difference between said signals, the combination of a recording mechanism comprising an endless belt, a pulley system for continuously rotating said belt, a magnetic clutch to which is operatively connected said variable element, the magnetic clutch being adapted for movement in the plane of said belt and actuated by said third signal in a manner so as to maintain substantially continuously a balance between the signal carrying the information and the standard signal, a recording pen affixed to said magnetic clutch, and means for moving recording paper in contact with the recording pen at a predetermined rate whereby variations in said variable element may be continuously recorded, said magnetic clutch including a magnetizable member, means for alternately energizing and deenergizing the magnetizable member in accordance with variations in said characteristic of the third signal, a base member, and a magnetic plate movably mounted between the magnetizable member and the base member to engage normally the belt strand between the magntic plate and the base member when the magnetizable member is deenergized and to engage the belt strand between the magnetic plate and the magnetizable member when the magnetizable member is energized.

JOHN P. WOODS.

REFERENCES CITED

The following references are of record in the file of this patent:

UNITED STATES PATENTS

| Number | Name | Date |
| --- | --- | --- |
| 2,206,894 | Silverman | July 9, 1940 |
| 2,349,225 | Scherbatskoy et al. | May 16, 1944 |
| 2,397,535 | Cooley | Apr. 2, 1946 |
| 2,412,639 | Traugott | Dec. 17, 1946 |
| 2,424,622 | McClure | July 29, 1947 |
| 2,446,527 | Chun | Aug. 10, 1948 |
| 2,488,491 | Davis | Nov. 15, 1949 |

---

Certificate of Correction

Patent No. 2,626,979

January 27, 1953

JOHN P. WOODS

It is hereby certified that error appears in the printed specification of the above numbered patent requiring correction as follows:

Column 1, line 23, for "Preferably" read *Probably*; column 8, line 28, for "brid" read *grid*;

and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.*

Certificate of Correction

Patent No. 2,626,979 January 27, 1953

JOHN P. WOODS

It is hereby certified that error appears in the printed specification of the above numbered patent requiring correction as follows:

Column 1, line 23, for "Preferably" read *Probably*; column 8, line 28, for "brid" read *grid*;

and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.*